May 6, 1958
S. P. GLASSER
2,833,374
CONSTANT FLOW LUBE SYSTEM
Filed July 7, 1954
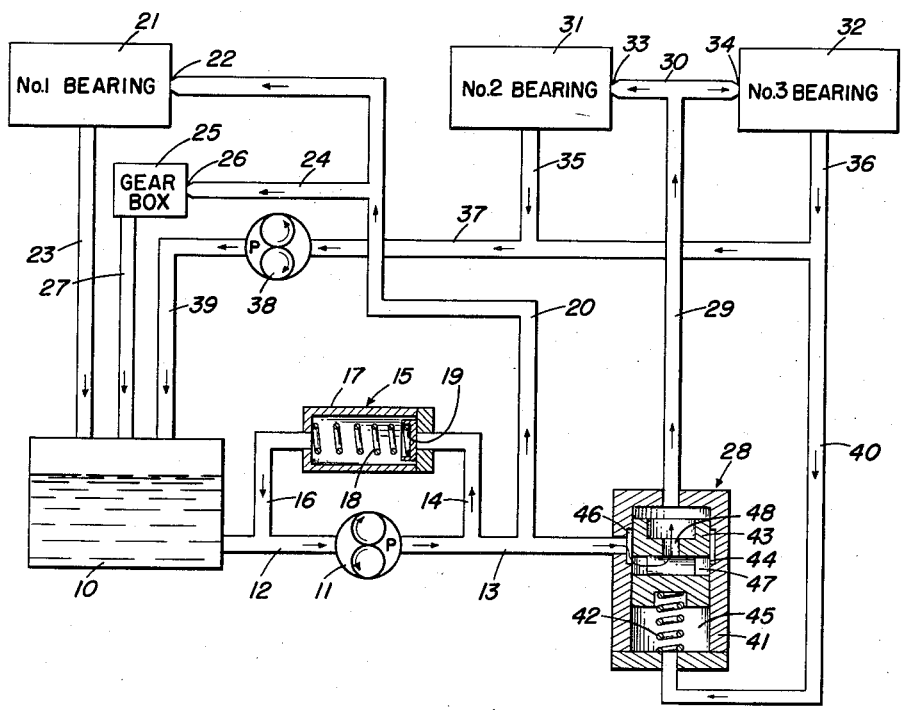
INVENTOR
SIDNEY P. GLASSER
BY
ATTORNEYS

United States Patent Office 2,833,374
Patented May 6, 1958

2,833,374

CONSTANT FLOW LUBE SYSTEM

Sidney P. Glasser, Long Beach, Calif., assignor, by mesne assignments, to the United States of America as represented by the Secretary of the Navy Application July 7, 1954, Serial No. 441,964

2 Claims. (Cl. 184—6)

This invention relates to a liquid flow system which transmits a constant volume of liquid from a constant pressure source to both fluctuating pressure areas and constant pressure areas in the system.

In a turbo jet engine wherein a central lubrication system is utilized, it is desirable that a constant volume of lubricant be delivered to all of the lubrication areas regardless of any changes in pressure at some of these areas. However, a turbo-jet engine, which operates according to the teachings of the prior art, utilizes a central lubrication system having a constant pressure source. The pressures at the number one bearing and in the accessory drive gearbox do not vary. On the other hand the number two and number three bearings are subjected to the internal pressures in the engine. The pressures surrounding the number two and number three bearings therefore vary from a relatively low pressure at high altitude to a relatively high pressure at high ram sea level. It is quite evident, therefore, that in a constant pressure system such as utilized by the prior art, that the variation in internal engine pressures will cause variation in oil flow to the number two and number three bearings. It is necessary that the bearings receive the required amount of oil for proper lubrication. Therefore, since less oil will flow to the number two and number three bearings when the engine is operating at high ram sea level than when it is operating at high altitude, the lubrication system is designed with the high ram condition as the critical point; that is, the system pressure is such that enough oil reaches the number two and number three bearings under the high ram sea level condition. It necessarily follows, therefore, that since the oil is fed from the source at constant pressure under all conditions that more oil than is necessary for proper lubrication will be fed to the number two and number three bearings when the engine is operating at conditions other than at high ram sea level. This increase in oil flow aggravates the scavenging problem at high altitudes and necessitates larger scavenging pumps.

The present invention overcomes the drawbacks of the prior art since it discloses a central lubrication system which transmits, under all operating conditions, a constant volume of liquid from a constant pressure source to both fluctuating pressure areas and constant pressure areas in the system. In brief, the present invention discloses a central lubrication system wherein a constant pressure source is utilized to transmit lubricant to the various lubricating areas within the system. Lubricating areas which vary in pressure under various operating conditions have pressure sensing means connected thereto which in turn operate throttling valves which are interposed between the lubricating area and the constant pressure lubricant source. An increase in pressure at a lubricating area will actuate the throttling valve to decrease the amount of throttling caused by the valve leading to that area whereas a decrease in pressure at the lubricating area will increase the amount of throttling. Thus it can be seen that an effective means is provided for compensating for the fluctuation in pressure at the lubricating area which in turn results in a constant volume of lubricant being fed to that area.

It is therefore the object of this invention to disclose a liquid flow system which transmits, under all operating conditions, a constant volume of liquid from a constant pressure source to both fluctuating pressure areas and constant pressure areas in the system.

Other objects and many of the attendant advantages of this invention will be readily appreciated as the same becomes better understood by reference to the following detailed description when considered in connection with the accompanying drawing which schematically discloses the invention.

In the drawing, numeral 10 denotes an oil reservoir. The intake side of lubricating pump 11 is connected to the outlet of reservoir 10 by means of pipe 12. Pipe 13 is connected to the delivery side of lubrication pump 11. Pipe 14 leads from pipe 13 to the inlet side of relief valve 15. The outlet side of relief valve 15 is connected to pipe 12 through line 16. The relief valve 15 serves the function of preventing the pressure in the system downstream of pump 11 from exceeding a predetermined maximum. Relief valve 15 is of conventional construction and consists of a housing 17 containing spring 18 which presses valve 19 against a seat in the valve housing 17. If the pressure in the system exceeds a predetermined maximum, spring 18 will yield under the pressure in pipe 14 to allow the pressure in the system which is downstream of lubrication pump 11 to decrease.

Also connected to pipe 13 is pipe 20 which leads to the number one bearing 21 of a turbo jet engine. Since the operating pressure of the number one bearing 21 does not change for various operating conditions of the turbo jet engine, a constant oil pressure will cause a constant volume of oil to flow through this bearing. In view of the fact that the pressure in pipe 20 is constant, an orifice 22 of suitable dimensions is interposed between line 20 and bearing 21 in order to cause the required amount of oil to flow to this bearing. Pipe 23 leads from the outlet of the number one bearing 21 to the oil reservoir 10.

Pipe 24 is connected to pipe 20 and leads to accessory gear box 25 which operates at constant pressure. Since both the pressure in pipe 24 and the operating pressure of gear box 25 are constant, an orifice 26 of suitable dimensions interposed between pipe 24 and gear box 25 will cause delivery of the constant required amount of oil to the gear box. Pipe 27 leads from the gear box 25 back to the oil reservoir 10.

Control valve 28 has its inlet side connected to pipe 13. Pipe 29, via pipe 30 leads from the outlet of control valve 28 to the number two bearing 31 and number three bearing 32. Orifices 33 and 34 are interposed between pipe 30 and bearings 31 and 32, respectively. As mentioned above, the internal pressures within the turbo-jet engine vary with the conditions under which the engine is being used. As a result of this, the amount of oil flowing to these bearings, if brought directly to the bearings from a constant pressure source, would vary inversely with the internal pressures of the bearings. This system would have the drawback explained above.

Connected to the outlet sides of bearings 31 and 32 are scavenging lines 35 and 36, respectively. These lines are joined with line 37 which is connected to the inlet of scavenging pump 38. The discharge side of scavenging pump 38 is connected to line 39 which feeds the scavenged oil to the oil reservoir 10. The scavenging lines 35 and 36 are short and of relatively large diameter. These characteristics of the scavenging lines reduce the pressure drop in the lines to a negligible value. Pressure sensing line 40 leads from line 36 to the pressure sensing side of control valve 28. Pipes 29 and 30 are of large diameter compared to the size of orifices 33 and 34, causing the pressure drop in the lines to be a negligible value. It is readily seen that control valve 28 senses, through lines 29 and 40, the pressure differential existing across orifices 33 and 34. The control valve 28 has a housing 41. Mounted within housing 41 is piston 43 which fits into a mating cylinder 45. Annular groove 46 is formed integrally with cylinder 45, and annular groove 47 is formed integrally with piston 43. The oil passes from groove 46 to groove 47 through throttling area 44. The throttled oil then passes through orifice 48, which is connected to groove 47, to pipe 29. Mounted within housing 41 is spring 42 which tends to bias piston 43 such that throttling area 44 is large. The pressure differential existing in lines 29 and 40 act across piston 43 and cause the piston to move against the force of spring 42, decreasing throttling area 44 such that a predetermined amount of throttling is produced. An increase in pressure in bearings 31 and 32 will cause the piston to move such that less throttling is produced at throttling area 44, thereby increasing the inlet pressure at orifices 33 and 34 by an amount approximately equal to the increase in pressure inside the bearings. A decrease in pressure in bearings 31 and 32 will have the opposite effect. By a proper choice of piston diameter and spring force, the piston can be made to throttle the flow through the control valve and thereby maintain the pressure upstream from the orifices at a given value above the bearing housing pressure. It can thus be seen that the above described system allows a predetermined amount of oil to flow to all lubricating areas at all times regardless of the changes in pressure at the various lubricating areas.

The drawing, as shown, has the control valve 28 feeding both the number two bearing 31 and the number three bearing 32 since both of these bearings are in the same pressure area. However, it can be readily seen that if the bearings 31 and 32 were in different pressure areas that a valve such as 28 could be interposed between the main lubricant line and each of said bearings.

Obviously many modifications and variations of the present invention are possible in the light of the above teachings. It is to be therefore understood that within the scope of the appended claims the invention may be practiced otherwise than specifically described.

Having thus described my invention I claim:

1. An automatic liquid flow system for transmitting constant volumes of liquid from a constant pressure source to a constant pressure area and to a variable pressure area, respectively, comprising a source of constant pressure liquid, a constant pressure area, first conduit means connecting said source to said constant pressure area, a variable pressure area, second conduit means for passage of said liquid in a constant direction and connecting said source to said variable pressure area, return conduit means for passage of said liquid in a constant direction and operatively connecting said variable pressure area to said source, automatic pressure responsive valve means interposed in said second conduit means between said source and said variable pressure area, pressure sensing means connecting said return conduit means with said variable pressure area and operatively connected to said pressure responsive valve means for sensing a change in pressure at said variable pressure area, said valve means including a means responsive to said pressure on the outlet side of said valve and ahead of said variable pressure area, said pressure responsive valve means responding to changes sensed by the sensing means to maintain a constant volume of liquid flowing to said variable pressure area under fluctuating pressure conditions at said variable pressure area.

2. A liquid flow system for transmitting constant volumes of liquid from a constant pressure source to a constant pressure area and to a variable pressure area, respectively, comprising a liquid reservoir, pump means connected to said reservoir, first conduit means connected to said pump, pressure relief means operatively connected to said first conduit means for maintaining the pressure in said first conduit means at a constant value, a constant pressure area, second conduit means connecting said first conduit means to said constant pressure area, a variable pressure area under fluctuating ambient pressure conditions, third conduit means connecting said first conduit means to said variable pressure area, pressure responsive valve means for regulating the flow of liquid into said variable pressure area, said pressure responsive valve means being interposed in said third conduit means between said pump and said variable pressure area, fourth conduit means connected to said variable pressure area, pressure sensing means operatively associated with said variable pressure area by said fourth conduit means and operatively connected to said pressure responsive valve means whereby a change in pressure at said variable pressure area causes a compensating change in said pressure responsive valve means which results in a constant volume of liquid flowing to said variable pressure area under fluctuating ambient pressure conditions at said variable pressure area, said valve means including a means responsive to said pressure on the outlet side of said valve and ahead of said variable pressure area, scavenging conduits connected between said constant pressure area and said reservoir and between said variable pressure area and said reservoir for returning said liquid from the pressure areas to the reservoir, and orifices interposed in said second and third conduit means for determining the amount of liquid delivered to said pressure areas.

References Cited in the file of this patent

UNITED STATES PATENTS

| | | |
|---|---|---|
| 219,114 | Ross | Sept. 2, 1879 |
| 868,219 | Pietzuch | Oct. 15, 1907 |
| 1,467,522 | Amsler | Sept. 11, 1923 |
| 1,640,842 | Loomis | Aug. 30, 1927 |
| 2,085,303 | Ernst | June 29, 1937 |
| 2,146,537 | Farnham | Feb. 7, 1939 |
| 2,155,218 | Cain | Apr. 18, 1939 |
| 2,272,684 | Vickers | Feb. 10, 1942 |

FOREIGN PATENTS

| | | |
|---|---|---|
| 11,727 | Great Britain | May 12, 1914 |